W. E. WELLS.
ATTACHMENT FOR BATH ROOM FIXTURES.
APPLICATION FILED MAR. 8, 1918.

1,276,463. Patented Aug. 20, 1918.

WITNESSES

INVENTOR
WILBER E. WELLS
BY Paul & Paul
ATTORNEYS

UNITED STATES PATENT OFFICE.

WILBER E. WELLS, OF MINNEAPOLIS, MINNESOTA.

ATTACHMENT FOR BATH-ROOM FIXTURES.

1,276,463.　　　　　Specification of Letters Patent.　　Patented Aug. 20, 1918.

Application filed March 8, 1918. Serial No. 221,168.

*To all whom it may concern:*

Be it known that I, WILBER E. WELLS, a citizen of the United States, resident of Minneapolis, county of Hennepin, State of Minnesota, have invented certain new and useful Improvements in Attachments for Bath-Room Fixtures, of which the following is a specification.

The object of my invention is to provide a means for mounting a bath room fixture on the wall, which will hold it securely and be invisible to the casual observer.

A further object is to provide a fastening means or attachment which will be inexpensive in construction and will form a strong substantial support for the fixture.

The invention consists generally in various constructions and combinations, all as hereinafter described and particularly pointed out in the claim.

In the accompanying drawings forming part of this specification,

Figure 1:
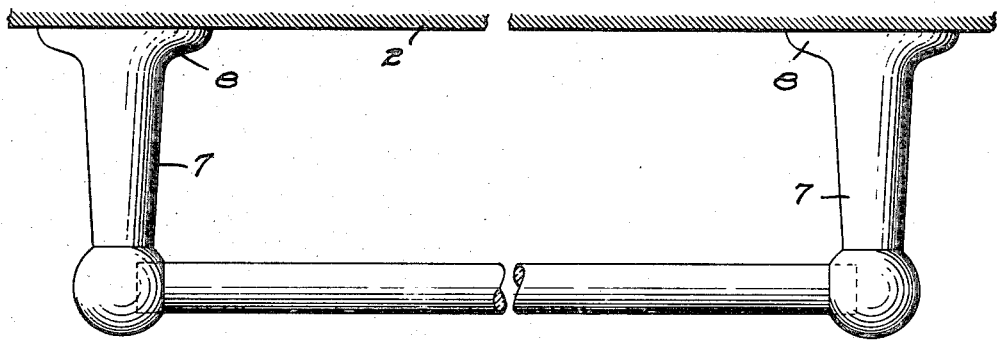
Figure 1 is a plan view of a towel rack with my invention applied thereto.
Figure 2:
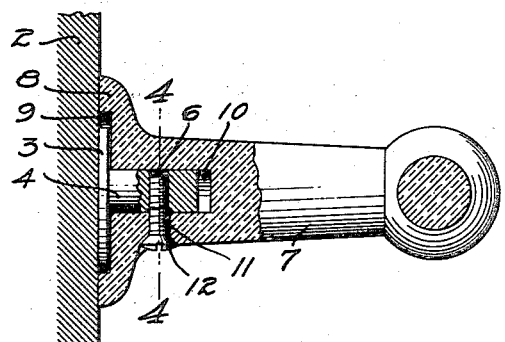
Fig. 2 is a sectional view showing the manner of mounting one of the fixture supports or stems upon the wall.
Figure 5:
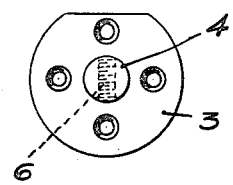
Fig. 5 is a front view of the stud whereon the fixture bracket or stem is mounted.
Figure 3:
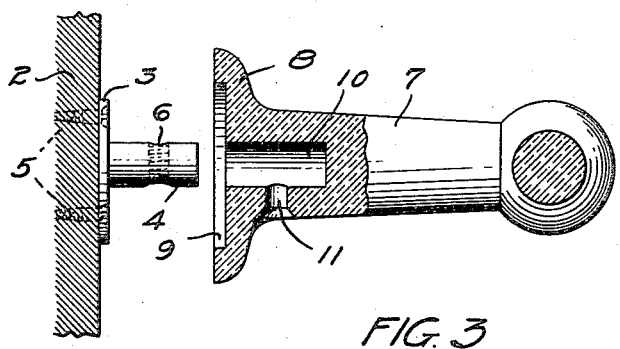
Fig. 3 is a similar view with the parts separated.
Figure 4:
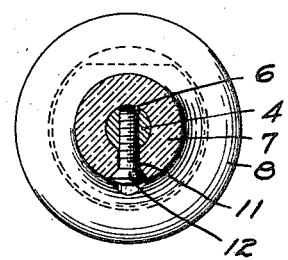
Fig. 4 is a transverse sectional view on the line 4—4 of Fig. 2.

In the drawing, 2 represents the wall of the room where the fixture is mounted and 3 is a disk or base for a stud or post 4 which projects outwardly therefrom. The disk has a flat rear face to be seated against the wall and is secured thereto by suitable means, such as screws 5. The stud 4 has a threaded opening 6 extending transversely therethrough from side to side. 7 is a stem or bracket, made of porcelain or other suitable material and having a base 8 provided with a recess 9 to receive the base of the stud 4 so that the outer portion of the base 8 is seated on the wall 2 and completely incloses the base 3. The stem 7 is also provided with a longitudinal socket 10 into which the stem 4 is inserted when the parts are assembled. An opening 11 is provided in the wall of the stem 7 opposite the threaded opening 6 in the stem 4, the outer end of the opening 11 being preferably counter-sunk and a screw 12 is inserted through the opening 11 and into the opening 6 and extends substantially through the stem to have a broad bearing surface therein. The opening 11 is so arranged that when the parts are assembled it is slightly out of alinement with the opening 6 so that the screw 12 will bear on the inner wall of the opening 11 and as the screw is tightened, its pressure on this wall will force the stem inwardly to clamp it firmly against the wall 2 and thereby prevent the fixture from working loose and sagging under the weight of the article, such as the towel rack or rod or glass or tooth brush holder which may be supported thereon. This substantial holding of the stem 7 is further brought about by the long bearing of the screw 12 in the stud 4 extending, as it does, practically through the stem from side to side.

I have found that this construction will insure a rigid holding of the stem 7 under all conditions of use. This holding screw, as shown, is mounted in the underside of the stem so that it will be invisible to an observer standing above or in front of the fixture. If desired at any time, the pressure of the stem on the wall may be increased by inserting a gasket of thin paper or like material between the base of the stem and the wall.

I claim as my invention:

The combination, with an upright wall, of a stud having a base plate secured thereto and projecting horizontally therefrom, a stem having a base provided with a recess and a longitudinal socket to receive said base plate and stud, said stud having a threaded opening extending transversely therein, the wall of said stem having an orifice therein opposite said opening and slightly out of alinement therewith, and a screw fitting within said orifice and said threaded opening, the pressure of said screw on the inner wall of said orifice operating to clamp the base of said stem securely against said wall.

In witness whereof, I have hereunto set my hand this 20th day of February, 1918.

WILBER E. WELLS.